US012003194B2

(12) United States Patent
Rivera Abarca et al.

(10) Patent No.: US 12,003,194 B2
(45) Date of Patent: Jun. 4, 2024

(54) MULTILEVEL POWER CONVERTER CIRCUIT

(71) Applicant: UNIVERSIDAD DE TALCA, Talca (CL)

(72) Inventors: Marco Esteban Rivera Abarca, Maule (CL); Mohammad Ali Hosseinzadeh, Curicó (CL); Maryam Sarbanzadeh, Curicó (CL)

(73) Assignee: UNIVERSIDAD DE TALCA, Talca (CL)

( * ) Notice: Subject to any disclaimer, the term of this patent is extended or adjusted under 35 U.S.C. 154(b) by 153 days.

(21) Appl. No.: 17/610,133

(22) PCT Filed: May 9, 2019

(86) PCT No.: PCT/CL2019/050038
§ 371 (c)(1),
(2) Date: Nov. 9, 2021

(87) PCT Pub. No.: WO2020/223830
PCT Pub. Date: Nov. 12, 2020

(65) Prior Publication Data
US 2022/0224245 A1 Jul. 14, 2022

(51) Int. Cl.
*H02M 7/537* (2006.01)
*H02M 7/483* (2007.01)

(52) U.S. Cl.
CPC .......... *H02M 7/537* (2013.01); *H02M 7/483* (2013.01)

(58) Field of Classification Search
CPC .......... H02M 7/483–49; H02M 7/537–53862
See application file for complete search history.

(56) References Cited

U.S. PATENT DOCUMENTS

| 2011/0115532 A1 | 5/2011 | Roesner et al. |
| 2014/0192572 A1 | 7/2014 | Tamai |

(Continued)

FOREIGN PATENT DOCUMENTS

| CN | 2768303 | 3/2006 |
| CN | 105450063 | 3/2016 |

OTHER PUBLICATIONS

International Search Report for related PCT/CL2019/050038, mailed Jul. 29, 2019, in 3 pages.

(Continued)

*Primary Examiner* — Peter M Novak
(74) *Attorney, Agent, or Firm* — Procopio, Cory, Hargreaves & Savitch LLP (57) ABSTRACT

The present invention relates, without being limited thereto, to the field of power electronics and non-linear control, and in particular to a topology structure of a multilevel power converter of the type of a cascaded bridge.

The present invention provides a new configuration of power converter comprising a functional block and is composed of a low number of devices; five sources of DC voltage, nine semiconductor switches, and two semiconductor diodes. Where switches $S_1$, $\overline{S}_1$ and $S_2$, $\overline{S}_2$ are devices complementary to each other. On the other hand, switch $S_3$ corresponds to a bidirectional switch. The present invention, in addition, presents a plurality of functional blocks connected in series, each of said functional blocks having the configuration of the circuit.

5 Claims, 5 Drawing Sheets

(56) References Cited

U.S. PATENT DOCUMENTS

2015/0003127 A1    1/2015   Takizawa
2017/0163171 A1    6/2017   Park

OTHER PUBLICATIONS

Written Opinion for related PCT/CL2019/050038, mailed Jul. 29, 2019, in 8 pages.

European Patent Office. European Search Report issued Sep. 28, 2022. European Patent Application No./ Patent No. 19897527.8-1202 / 3926810 PCT/CL2019050038. Name of Applicant: Universidad de Talca. English Language. 9 pages.

Hosseinzadeh, Mohammad Ali et al. "New Asymmetric Cascaded Multi-level Converter with Reduced Components", 2018 IEEE International Conference on Electrical Systems for Aircraft, Railway, Ship Propulsion and Road Vehicles & International Transportation Electrification Conference (ESARS-ITEC), IEEE, Nov. 7, 2018 (Nov. 7, 2018), pp. 1-6, XP033498193, DOI: 10.1109/ESARS-ITEC.2018.8607383. English Language.

Hosseinzadeh, Mohammad Ali et al. "New Single-Phase Asymmetric Reduced Multilevel Inverter Based on Switched-Diode for Cascaded Multilevel Inverters", 2019 IEEE International Conference on Industrial Technology (ICIT), IEEE, Feb. 13, 2019 (Feb. 13, 2019), pp. 1494-1499, XP033573243, DOI: 10.1109/ CIT.2019.8755088. English Language.

| $V_o$ | $S_1$ | $\bar{S}_1$ | $S_2$ | $\bar{S}_2$ | $S_3$ | $T_1$ | $\bar{T}_1$ | $T_2$ | $\bar{T}_2$ |
|---|---|---|---|---|---|---|---|---|---|
| $V_1 + V_2 + V_3 + V_4$ | 1 | 0 | 1 | 0 | 0 | 1 | 0 | 0 | 0 |
| $V_2 + V_3 + V_4$ | 0 | 1 | 1 | 0 | 1 | 1 | 0 | 0 | 0 |
| $V_3 + V_4$ | 0 | 1 | 1 | 0 | 0 | 1 | 0 | 0 | 0 |
| $V_1 + V_2 + V_4$ | 1 | 0 | 0 | 1 | 0 | 1 | 0 | 0 | 0 |
| $V_2 + V_4$ | 0 | 1 | 0 | 1 | 1 | 1 | 0 | 0 | 0 |
| $V_4$ | 0 | 1 | 0 | 1 | 0 | 1 | 0 | 0 | 0 |
| $V_1 + V_2 + V_3$ | 1 | 0 | 1 | 0 | 0 | 0 | 1 | 0 | 0 |
| $V_2 + V_3$ | 0 | 1 | 1 | 0 | 1 | 0 | 1 | 0 | 0 |
| $V_3$ | 0 | 1 | 1 | 0 | 0 | 0 | 1 | 0 | 0 |
| $V_1 + V_2$ | 1 | 0 | 0 | 1 | 0 | 0 | 1 | 0 | 0 |
| $V_2$ | 0 | 1 | 0 | 1 | 1 | 0 | 1 | 0 | 0 |
| $0$ | 1 | 0 | 1 | 0 | 0 | 0 | 0 | 0 | 1 |
| $-V_2$ | 0 | 1 | 1 | 0 | 1 | 0 | 0 | 0 | 1 |
| $-(V_1 + V_2)$ | 0 | 1 | 1 | 0 | 0 | 0 | 0 | 0 | 1 |
| $-(V_3)$ | 1 | 0 | 0 | 1 | 0 | 0 | 0 | 0 | 1 |
| $-(V_2 + V_3)$ | 0 | 1 | 0 | 1 | 1 | 0 | 0 | 0 | 1 |
| $-(V_1 + V_2 + V_3)$ | 0 | 1 | 0 | 1 | 0 | 0 | 0 | 0 | 1 |
| $-V_5$ | 1 | 0 | 1 | 0 | 0 | 0 | 0 | 1 | 0 |
| $-(V_2 + V_5)$ | 0 | 1 | 1 | 0 | 1 | 0 | 0 | 1 | 0 |
| $-(V_1 + V_2 + V_5)$ | 0 | 1 | 1 | 0 | 0 | 0 | 0 | 1 | 0 |
| $-(V_3 + V_5)$ | 1 | 0 | 0 | 1 | 0 | 0 | 0 | 1 | 0 |
| $-(V_2 + V_3 + V_5)$ | 0 | 1 | 0 | 1 | 1 | 0 | 0 | 1 | 0 |
| $-(V_1 + V_2 + V_3 + V_5)$ | 0 | 1 | 0 | 1 | 0 | 0 | 0 | 1 | 0 |

MULTILEVEL POWER CONVERTER CIRCUIT

CROSS-REFERENCE TO RELATED APPLICATIONS

This application is a US National Stage of International Patent Application PCT/CL2019/050038, filed May 9, 2019, the contents of which are incorporated herein by reference.

TECHNICAL FIELD OF THE INVENTION

The present invention relates to the field of power electronics and non-linear control, and in particular provides a multilevel power circuit of the type of a cascaded bridge.

BACKGROUND OF THE INVENTION

With the advance of power electronics technology, the application of power converters has become ever wider. The multilevel converters are widely used in the regulation of speed and in applications of medium and high tension in addition to the generation of clean energy, due to its low harmonic tension content and output current, and low reverse tension of the switch.

Multilevel inverters (MLI) are the main power conversion devices selected in industrial applications. These applications mainly comprise motor units for all voltage and power ranges. Multilevel inverters also have applications in systems connected to the network, untinterruptible power systems (UPS), electric vehicles and FACTS devices, among others.

In the state of the art there are precedents of different topologies for multilevel inverters. For example, document CN2768303 describes a utility model that provides a multistage cascade inverter, which aims to reduce the number of components used, simplify its structure and control in the event of high tension and high power events, and generate the same level as a conventional cascade inverter. The multi-level cascade inverter of the utility model is composed of a basic module cascaded to form a multi-level inverter.

On the other hand, document CN105450063 provides a multilevel invertor of the type of a cascaded half-bridge and a control method thereof, with the aim of overcoming the deficiencies of the control strategy and the existing multilevel cascade topology. The control strategy adopts a control mode of a cycle, and the superposition of output levels to generate a multilevel output.

However, in general, the power converter circuits have a complex configuration and a large number of components. Therefore, a new configuration is required to optimize said topology, achieving the desired number of levels with the least possible number of components.

Consequently, a new structure is required for a power converter circuit that achieves the number of levels required, having a simplified configuration and reducing the number of components used.

SUMMARY OF THE INVENTION

Figure 10:
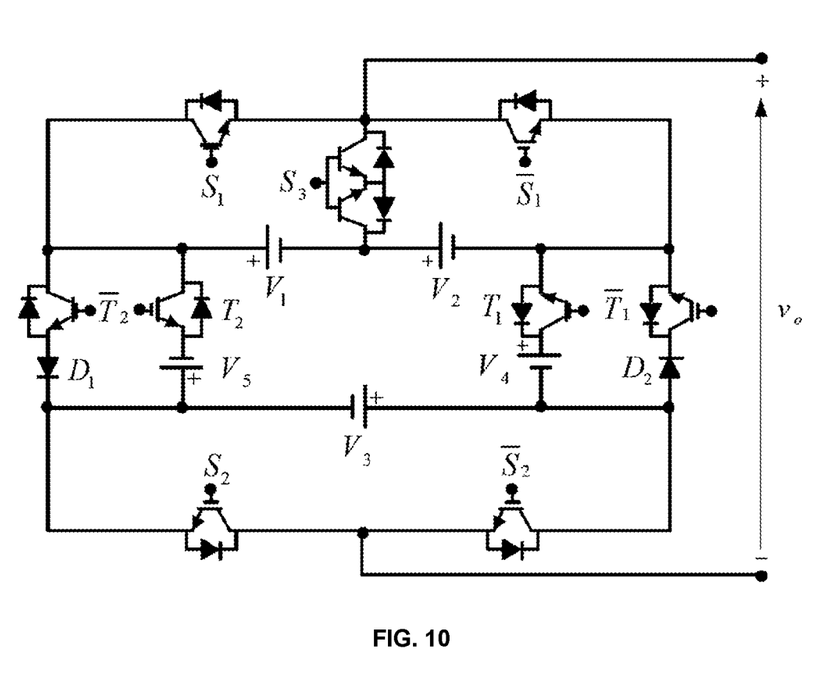
FIG. 10 shows a configuration of circuit of the functional block of the power converter that is the object of the present invention.

The present invention provides a new configuration of a power converter comprising a functional block having the configuration of circuit shown in FIG. 10:
where $V_1$, $V_2$, $V_3$, $V_4$, $V_5$ are sources of DC voltage;
where $S_1$, $\overline{S}_1$, $S_2$, $\overline{S}_2$, $S_3$, $T_1$, $\overline{T}_1$, $T_2$, $\overline{T}_2$ are semiconductor switches; and
where $D_1$ and $D_2$ are two semiconductor diodes.

In a preferred embodiment, the circuit is characterized in that the switches $S_1$, $\overline{S}_1$ and $S_2$, $\overline{S}_2$ are devices complementary to each other.

In another preferred embodiment, the circuit is characterized in that the switch $S_3$ corresponds to a bidirectional switch.

In another preferred embodiment, the circuit is characterized in that it comprises a plurality of functional blocks connected in series, each of said functional blocks having the configuration of circuit shown in FIG. 10. In a more preferred embodiment, the circuit is characterized in that it comprises two functional blocks connected in series and in that the outputs of said functional blocks are asymmetrical with each other.

DETAILED DESCRIPTION OF THE INVENTION

Essentially, the present invention provides a new configuration of a multilevel power converter comprising; five sources of DC voltage ($V_1$, $V_2$, $V_3$, $V_4$, $V_5$), eight unidirectional semiconductor switches ($S_1$, $\overline{S}_1$, $S_2$, $\overline{S}_2$, $S_3$, $T_1$, $\overline{T}_1$, $T_2$, $\overline{T}_2$), a bidirectional semiconductor switch ($S_{3)}$, and two semiconductor diodes ($D_1$ and $D_2$).

The present invention provides a new configuration of power converter comprising a functional block having the configuration of circuit shown in FIG. 10:
where $V_1$, $V_2$, $V_3$, $V_4$, $V_5$ are sources of DC voltage;
where $S_1$, $\overline{S}_1$, $S_2$, $\overline{S}_2$, $S_3$, $T_1$, $\overline{T}_1$, $T_2$, $\overline{T}_2$ are semiconductor switches; and
where $D_1$ and $D_2$ are two semiconductor diodes.

Switches $S_1$, $\overline{S}_1$ and $S_2$, $\overline{S}_2$ are switches complementary to each other. That is, when one is open, the other is necessarily closed. The purpose of this is to avoid short circuiting of the voltage sources $V_1$, $V_2$ and $V_3$ respectively.

The switch $S_3$ is a bidirectional switch, which allows the passage of current in both directions.

Figure 9:
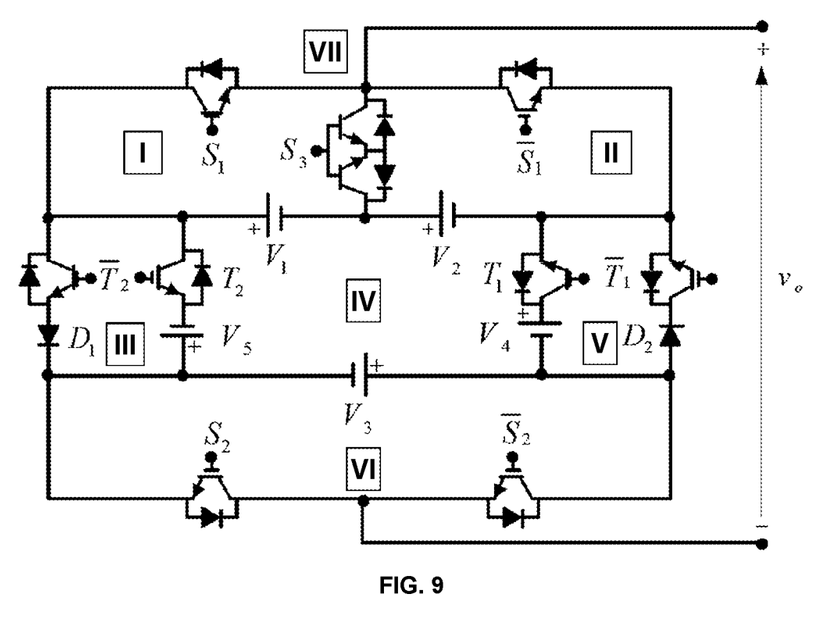
FIG. 9 shows the distribution of meshes in said functional block of the power converter circuit.

For a better understanding, this without limiting the scope of the present invention, a description of said functional block is presented below. Said functional block is divided into 7 meshes, this without limiting the scope of the present invention. The description of the components of each mesh will be done in a clockwise direction, this without limiting the scope of the present invention:

Mesh I: comprises a switch, $S_1$, connected to another bidirectional switch, $S_3$, which, in turn, is then connected to a voltage source $V_1$ which is subsequently connected to said switch $S_1$.

Mesh II: comprises a switch, $\overline{S}_1$, connected to a voltage source, $V_2$, which in turn is then connected to the bidirectional switch, $S_3$, which is then connected to said switch, $\overline{S}_1$.

Mesh III: comprises a switch, $T_2$, connected to a voltage source, $V_2$, which in turn is connected to a diode, $D_1$. Said diode, $D_1$, in turn, is connected to a switch, $T_2$, which is then connected to said switch, $T_2$.

Mesh IV: comprises the voltage source, $V_1$, connected to the voltage source, $V_2$, which in turn is connected to a switch, $T_1$. Said switch, $T_1$, is then connected to a voltage source, $V_4$, connected to another voltage source, $V_3$, then connected to an additional voltage source, $V_5$. Said voltage source, $V_5$, is then connected with switch, $T_2$, which in turn is connected to said voltage source $V_1$.

Mesh V: comprises a switch, $T_1$, with a diode, $D_2$, which in turn connects to the voltage source, $V_4$. Said voltage source, $V_4$, is then connected to a switch, $T_1$, which in turn is connected to said switch, $T_1$.

Mesh VI: comprises the voltage source, $V_3$, connected to a switch, $\overline{S}_2$, which in turn is connected to another switch, $S_2$. Said switch, $S_2$, is then connected to said voltage source $V_3$.

Mesh VII (external): comprises switch $S_1$ connected to switch $\overline{S}_1$. Said switch $\overline{S}_1$ is connected to switch $\overline{T}_1$. Then, said switch $\overline{T}_1$, is connected with diode $D_2$, which, in turn, is connected to switch $\overline{S}_2$. Switch $\overline{S}_2$ is then connected to switch $S_2$, which, in turn, is connected to diode $D_1$. Said diode $D_1$ is connected to switch $\overline{T}_2$, which is finally connected to switch $S_1$.

The output voltage is determined from the difference in voltage generated between two nodes; the first node is located between switches $S_1$, $\overline{S}_1$ and $S_3$; the second node is located between switches $S_2$ and $\overline{S}_2$.

Both the voltage value of the sources and the nature of the components of the circuit do not limit the scope of the present invention and will depend, for example, on the application for which the power converter is intended.

On the other hand, the output voltage of the functional blocks does not limit the scope of the present invention. In a preferred embodiment, it is in a range between 0 [V] and 1200 [V].

Additionally, the output current of the functional blocks does not limit the scope of the present invention. In a preferred embodiment, it is in a range between 0 [A] and 8 [A]. Nevertheless, higher output currents may be used without limiting the scope of the present invention.

Consequently, the output power of the functional blocks does not limit the scope of the present invention either. In a preferred embodiment, it is in a range of between 0 [kW] and 10 [kW].

In the context of the present invention, this without limiting the scope of the requested protection, a diode will be understood as a two-electrode electronic valve that only lets the current pass in one direction, preventing the passage of current in the opposite direction.

In the context of the present invention, this without limiting the scope of the requested protection, a semiconductor switch will be understood as an electronic power device provided with electronic semiconductor valves, and which aims to open or close the passage of electric current in a circuit.

In the context of the present invention, this without limiting the scope of the requested protection, a functional block will be understood as a set of electrical and/or electronic elements that are interconnected in such a way that the assembly fulfills a specific function.

In the context of the present invention, this without limiting the scope of the requested protection, asymmetrical outputs will be understood as the configuration whose main blocks generate different levels of output voltage.

In the context of the present invention, a series connection will be understood as a connection configuration in which the devices are connected successively.

Figure 1:
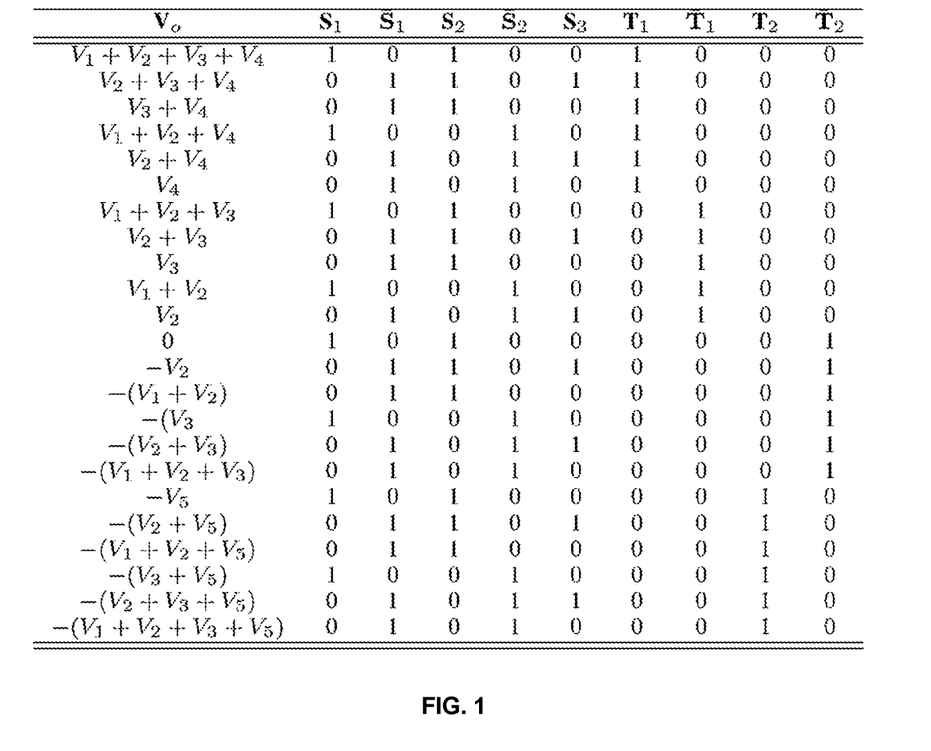
FIG. 1 shows a general truth table, with the states of all the switches of a functional block with respect to the voltage output levels of the power converter circuit that is the object of the present invention.

FIG. 1 shows a general truth table, where the states of the switches are observed in relation to the 23 levels of output voltage of the circuit. Said output voltage levels are detailed below:

At the first voltage level, switches $S_1$, $S_2$ and $T_1$ are closed, switches $\overline{S}_1$, $\overline{S}_2$, $S_3$, $\overline{T}_1$, $T_2$, $\overline{T}_2$ are open, and the voltage output is $(V_1+V_2+V_3+V_4)$.

At the second voltage level the switches $\overline{S}_1$, $S_2$, $S_3$, $T_1$ are closed, switches $S_1$, $\overline{S}_2$, $\overline{T}_1$, $T_2$, $\overline{T}_2$ are open, and the output voltage is $(V_2+V_3+V_4)$.

At the third voltage level, switches $\overline{S}_1$, $S_2$, $T_1$ are closed, switches $S_1$, $\overline{S}_2$, $S_3$, $\overline{T}_1$, $T_2$, $\overline{T}_2$ are open, and the output voltage is $(V_3+V_4)$.

At the fourth voltage level, switches $S_1$, $\overline{S}_2$, $T_1$ are closed, switches $\overline{S}_1$, $S_2$, $S_3$, $\overline{T}_1$, $T_2$, $\overline{T}_2$ are open, and the output voltage is $(V_1+V_2+V_4)$.

At the fifth voltage level, switches $S_1$, $\overline{S}_2$, $S_3$, $T_1$ are closed, switches $S_1$, $S_2$, $\overline{T}_1$, $T_2$, $\overline{T}_2$ are open, and the output voltage is $(V_2+V_4)$.

At the sixth voltage level, switches $\overline{S}_1$, $\overline{S}_2$, $T_1$ are closed, switches $S_1$, $S_2$, $S_3$, $\overline{T}_1$, $T_2$, $\overline{T}_2$ are open, and the output voltage is $(V_4)$.

At the seventh voltage level, switches $S_1$, $S_2$, $T_1$ are closed, switches $\overline{S}_1$, $\overline{S}_2$, $S_3$, $\overline{T}_1$, $T_2$, $\overline{T}_2$ are open, and the voltage output is $(V_1+V_2+V_3)$.

At the eighth voltage level, switches $\overline{S}_1$, $S_2$, $S_3$, $T_1$ are closed, switches $S_1$, $\overline{S}_2$, $\overline{T}_1$, $T_2$, $\overline{T}_2$ are open, and the output voltage is $(V_2+V_3)$.

At the ninth voltage level, switches $\overline{S}_1$, $S_2$, $\overline{T}_1$ are closed, switches $S_1$, $\overline{S}_2$, $S_3$, $T_1$, $T_2$, $\overline{T}_2$ are open, and the output voltage is $(V_3)$.

At the tenth voltage level, switches $S_1$, $\overline{S}_2$, $T_1$ are closed, switches $\overline{S}_1$, $S_2$, $S_3$, $\overline{T}_1$, $T_2$, $\overline{T}_2$ are open, and the output voltage is $(V_1+V_2)$.

At the eleventh voltage level, switches $\overline{S}_1$, $\overline{S}_2$, $S_3$, $T_1$ are closed, switches $S_1$, $S_2$, $\overline{T}_1$, $T_2$, $\overline{T}_2$ are open, and the voltage output is $(V_2)$.

At the twelfth voltage level, switches $S_1$, $S_2$, $T_2$ are closed, switches $\overline{S}_1$, $\overline{S}_2$, $S_3$, $T_1$, $\overline{T}_1$, $\overline{T}_2$ are open, and the output voltage is $(0)$.

At the thirteenth voltage level, switches $\overline{S}_1$, $S_2$, $S_3$, $\overline{T}_2$ are closed, switches $S_1$, $\overline{S}_2$, $T_1$, $\overline{T}_1$, $T_2$ are open, and the output voltage is $(-V_2)$.

At the fourteenth voltage level, switches $\overline{S}_1$, $S_2$, $\overline{T}_2$ are closed, switches $S_1$, $\overline{S}_2$, $S_3$, $T_1$, $\overline{T}_1$, $T_2$ are open, and the output voltage is $(-V_1-V_2)$.

At the fifteenth voltage level, switches $S_1$, $\overline{S}_2$, $\overline{T}_2$ are closed, switches $\overline{S}_1$, $S_2$, $S_3$, $T_1$, $\overline{T}_1$, $T_2$ are open, and the output voltage is $(-V_3)$.

At the sixteenth voltage level, switches $\overline{S}_1$, $\overline{S}_2$, $S_3$, $\overline{T}_2$ are closed, switches $S_1$, $S_2$, $T_1$, $\overline{T}_1$, $T_2$ are open, and the output voltage is $(-V_2-V_3)$.

At the seventeenth voltage level, switches $\overline{S}_1$, $\overline{S}_2$, $T_2$ are open, switches $S_1$, $S_2$, $S_3$, $T_1$, $\overline{T}_1$, $T_2$ are closed, and voltage output is $(-V_1-V_2-V_3)$.

At the eighteenth voltage level, switches $S_1$, $S_2$, $T_2$ are closed, switches $\overline{S}_1$, $\overline{S}_2$, $S_3$, $T_1$, $\overline{T}_1$, $\overline{T}_2$ are open, and the voltage of output is $(-V_5)$.

At the nineteenth voltage level, switches $\overline{S}_1$, $S_2$, $S_3$, $T_2$ are closed, switches $S_1$, $\overline{S}_2$, $T_1$, $\overline{T}_1$, $\overline{T}_2$ are open, and the output voltage is $(-V_2-V_5)$.

At the twentieth voltage level, switches $\overline{S}_1$, $S_2$, $T_2$ are closed, switches $S_1$, $\overline{S}_2$, $S_3$, $T_1$, $\overline{T}_1$, $\overline{T}_2$ are open, and the output voltage is $(-V_1-V_2-V_5)$.

At the twenty-first voltage level, switches $S_1$, $\overline{S}_2$, $T_2$ are closed, switches $\overline{S}_1$, $S_2$, $S_3$, $T_1$, $\overline{T}_1$, $\overline{T}_2$ are open, and the output voltage is $(-V_3-V_5)$.

At the twenty-second voltage level, the switches $\overline{S}_1$, $\overline{S}_2$, $S_3$, $T_2$ are closed, switches $S_1$, $S_2$, $T_1$, $\overline{T}_1$, $\overline{T}_1$ are open, and the output voltage is $(-V_2-V_3-V_5)$.

At the twenty-third voltage level, switches $\overline{S}_1$, $\overline{S}_2$, $T_2$ are closed, switches $S_1$, $S_2$, $S_3$, $T_1$, $\overline{T}_1$, $\overline{T}_1$ are open, and the output voltage is $-(V_1+V_2+V_3+V_5)$.

Figure 2:
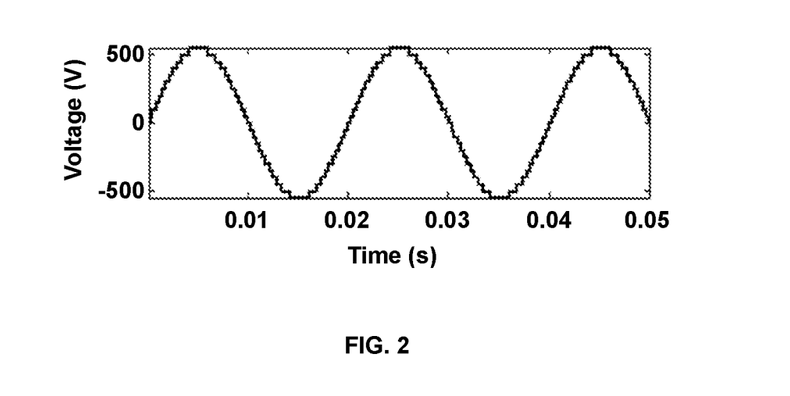
FIG. 2 shows a graph with the output voltage for said functional block of the power converter circuit that is the object of the present invention.

FIG. 2 shows a graph with the output voltage in a particular embodiment of a functional block through time. In said graph it is observed that the voltage value ranges between −550V and 550V.

Figure 3:
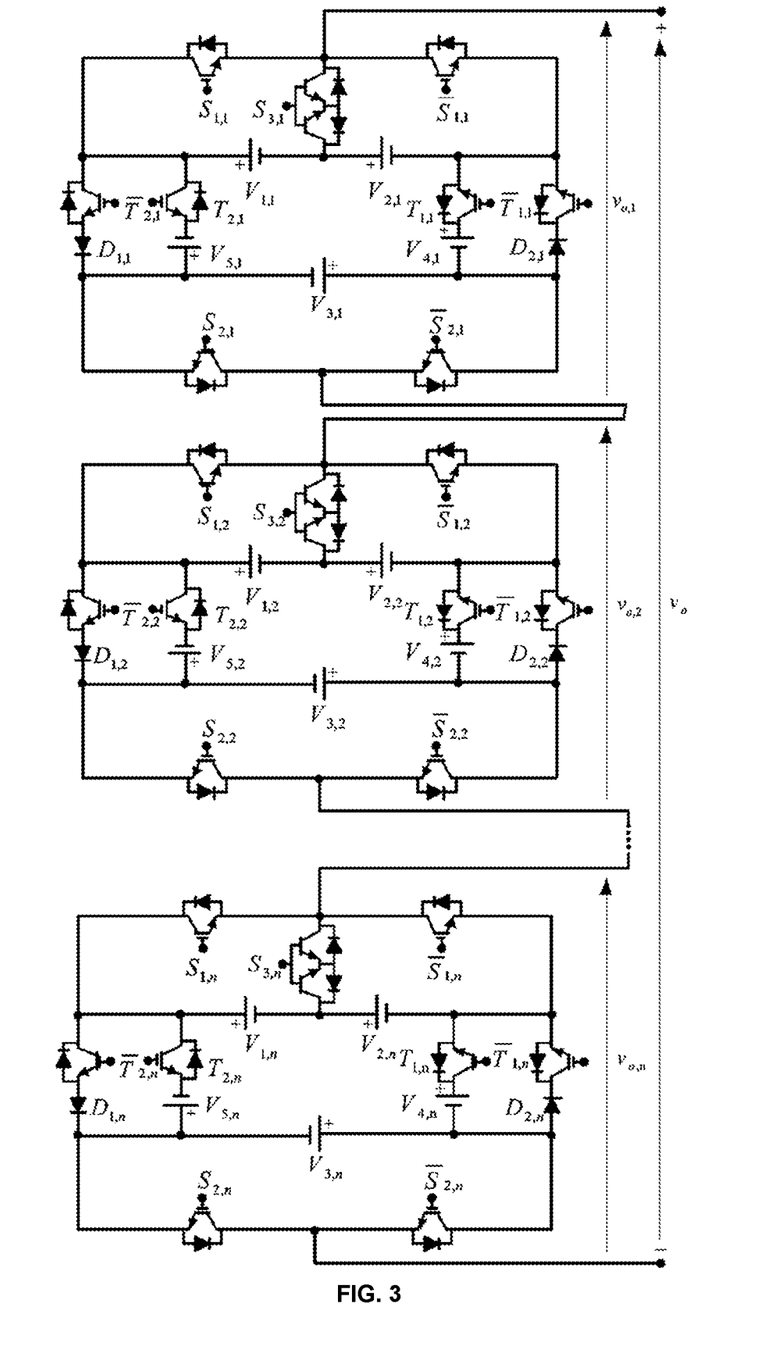
FIG. 3 shows the cascade arrangement of said functional block of the power converter circuit that is the object of the present invention.

FIG. 3 shows the generic cascading arrangement for a plurality of functional blocks connected in series with each other, and configured to achieve the provision of a number of levels of determined output voltages. The number of levels that each functional block is capable of generating is detailed in the truth table of FIG. 1.

Figure 4:
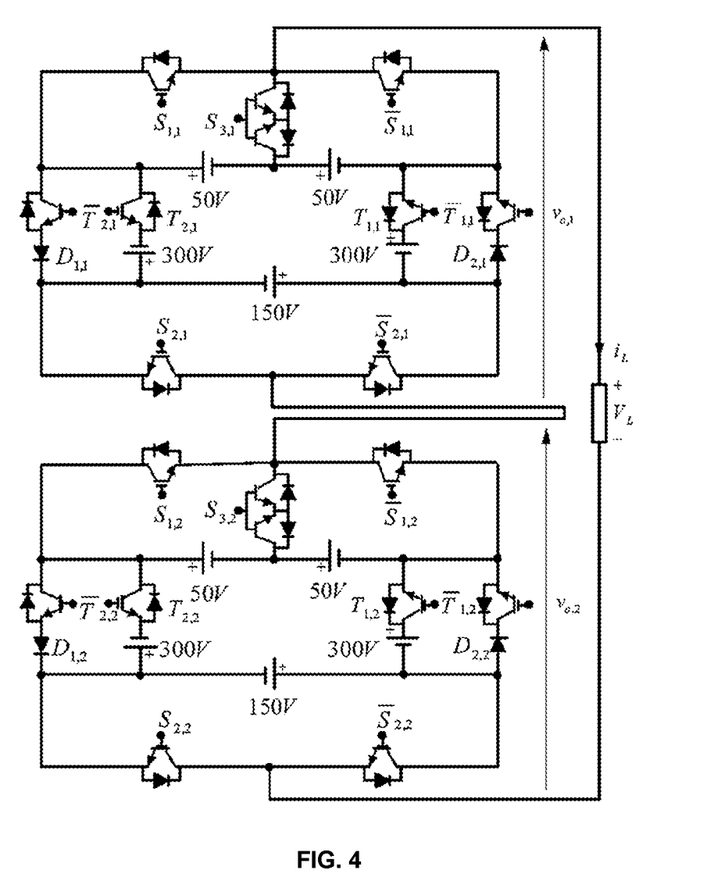
FIG. 4 shows an example of embodiment of the power converter circuit that is the object of the present invention.

FIG. 4 shows an example of embodiment of the power convertor circuit that is the object of the present invention. In said example of embodiment, this without limiting the scope of the applied protection, a circuit of a power converter of an output phase is illustrated, which generates 45 voltage levels. FIG. 4 shows that the proposed structure comprises two functional blocks connected in series.

In a more preferred embodiment, this without limiting the scope of the present invention, the values for said DC voltage sources illustrated in FIG. 4 are:

$$V_{1,1} = V_{2,1} = V_{1,2} = V_{2,2} = 50 \text{ V}$$
$$V_{3,1} = V_{3,2} = 150 \text{ V}$$
$$V_{4,1} = V_{5,2} = 300 \text{ V}$$

The peak output voltage is 1100V having a step voltage of 50V with an output frequency of 50 Hz, and the peak current is 7.3 A.

Figure 5:
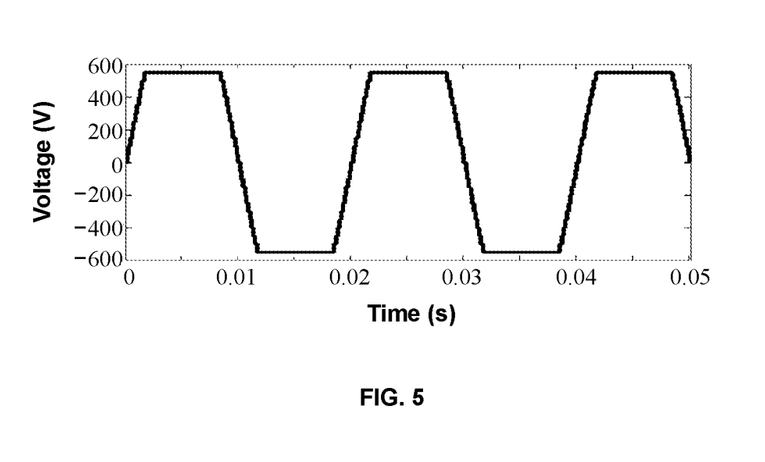
FIG. 5 shows a graph with the output voltage of the first functional block in said example of embodiment.

FIG. 5 shows a graph with the output voltage of the first functional block in said example of embodiment. The output voltage of said first functional block describes a step function that ranges between −550V and 550V.

Figure 6:
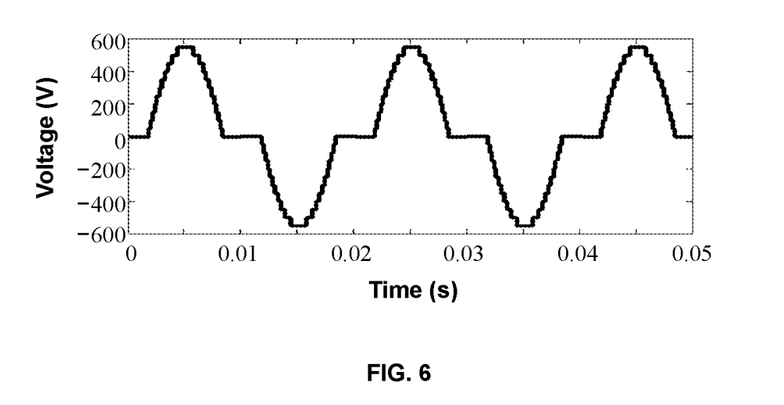
FIG. 6 shows a graph with the output voltage of the second functional block in said example of embodiment.

FIG. 6 shows a graph with the output voltage of the second functional block in said example of embodiment. The output voltage of said second functional block describes a sinusoidal function that oscillates between −550V and 550V, having a step at zero.

Figure 7:
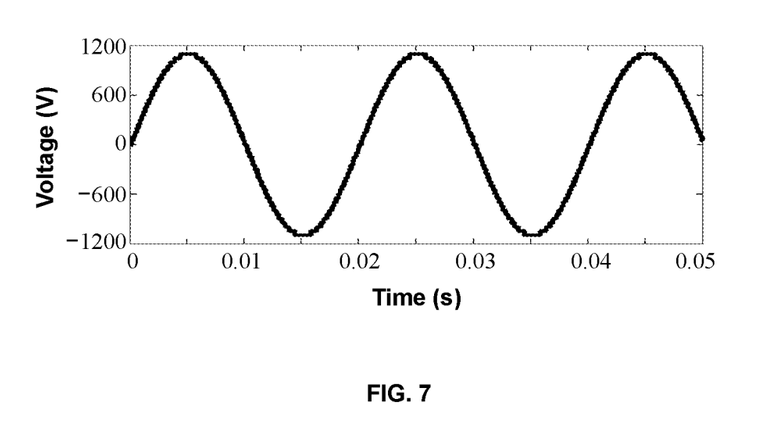
FIG. 7 shows a graph with the output voltage of the circuit in said example of embodiment.

In FIG. 7 a graph with the output voltage of the circuit in said example of embodiment is shown. The output voltage of said circuit describes a sinusoidal function that oscillates between −1100V and 1100V and that is the sum of the output voltage of the first functional block with the output voltage of the second functional block.

Figure 8:
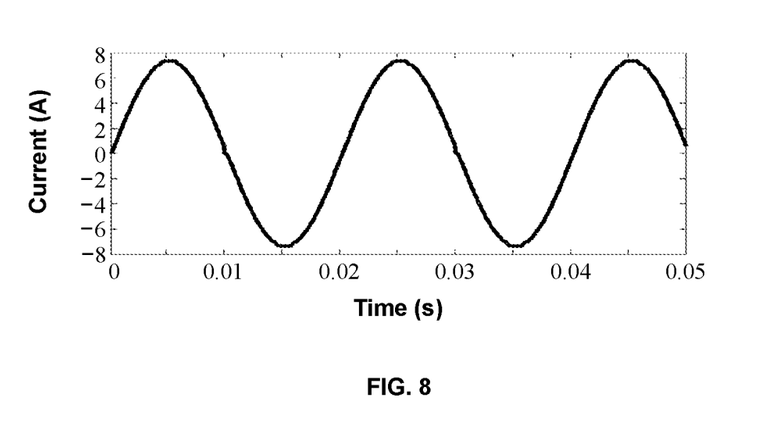
FIG. 8 shows a graph with the output current of the circuit in said example of embodiment.

FIG. 8 shows a graph with the output current of the circuit in said example of embodiment. The output current of said circuit describes a sinusoidal function that oscillates between −7.3 A and 7.3 A.

FIG. 9 shows an enumeration of meshes that form a functional block of the power converter circuit. In said figure, the enumeration referring to each mesh described in the present detailed description is indicated. Said enumeration was made in order to provide a better understanding of the present invention, but does not limit the scope of the applied protection.

According to the previously detailed invention, it is possible to obtain a 23-level power converter circuit, which has a simplified configuration and reduces the number of components used.

It should be understood that different options of technical features of the present invention can be combined in any foreseen manner by a person with average knowledge in the technical field without limiting the scope of the present invention.

Next, examples of embodiment of the present invention will be presented. It should be understood that the purpose of said examples is to provide a better understanding of the invention but in no case limit the scope thereof. Additionally, technical characteristics presented in different examples may be combined with each other, or with other technical characteristics previously described, in any foreseen manner by a person with average knowledge in the technical field without limiting the scope of the present invention.

EXAMPLE OF EMBODIMENT

Example 1: Realization of the Circuit of a Power Converter That is Object of the Present Invention FIG. 4 illustrates a circuit of a single-phase power converter that generates 45 voltage levels. FIG. 4 shows that the proposed structure comprises two functional blocks connected in series.

In order to verify that the configuration of said circuit allows obtaining the expected output, a simulation of the circuit was performed. In said simulation, the set of semiconductor devices such as switches and diodes are supposed to be ideal. The values selected for the DC voltage sources are:

$$V_{1,1} = V_{2,1} = V_{1,2} = V_{2,2} = 50 \text{ V}$$
$$V_{3,1} = V_{3,2} = 150 \text{ V}$$
$$V_{4,1} = V_{5,2} = 300 \text{ V}$$

The peak output voltage is 1100V, having a step voltage of 50V with an output frequency of 50 Hz, and the peak current is 7.3 A.

The invention claimed is:

1. A multilevel power converter circuit characterized in that the multilevel power converter circuit comprises a circuit configuration shown in FIG. 10, where $V_1$, $V_2$, $V_3$, $V_4$, $V_5$ are sources of DC voltage;
where $S_1$, $\overline{S}_1$, $S_2$, $\overline{S}_2$, $S_3$, $T_1$, $\overline{T}_1$, $T_2$, $\overline{T}_2$ are semiconductor switches; and
where $D_1$ and $D_2$ are two semiconductor diodes.

2. The circuit according to claim 1, characterized in that the semiconductor switches $S_2$, $\overline{S}_1$ and $S_2$, $\overline{S}_2$ are devices complementary to each other.

3. The circuit according to claim 1, characterized in that the semiconductor switch $S_3$ corresponds to a semiconductor bidirectional switch.

4. A circuit comprising a plurality of functional blocks having the configuration of circuit of claim 1 connected in series.

5. The circuit according to claim 4, comprising two functional blocks connected in series and in that outputs of said functional blocks are asymmetrical with each other.

* * * * *